Nov. 22, 1966  C. A. KRUSE, JR  3,286,594
PRESSURE CONTROL TOOL DRIVING DEVICE
Filed Aug. 10, 1965
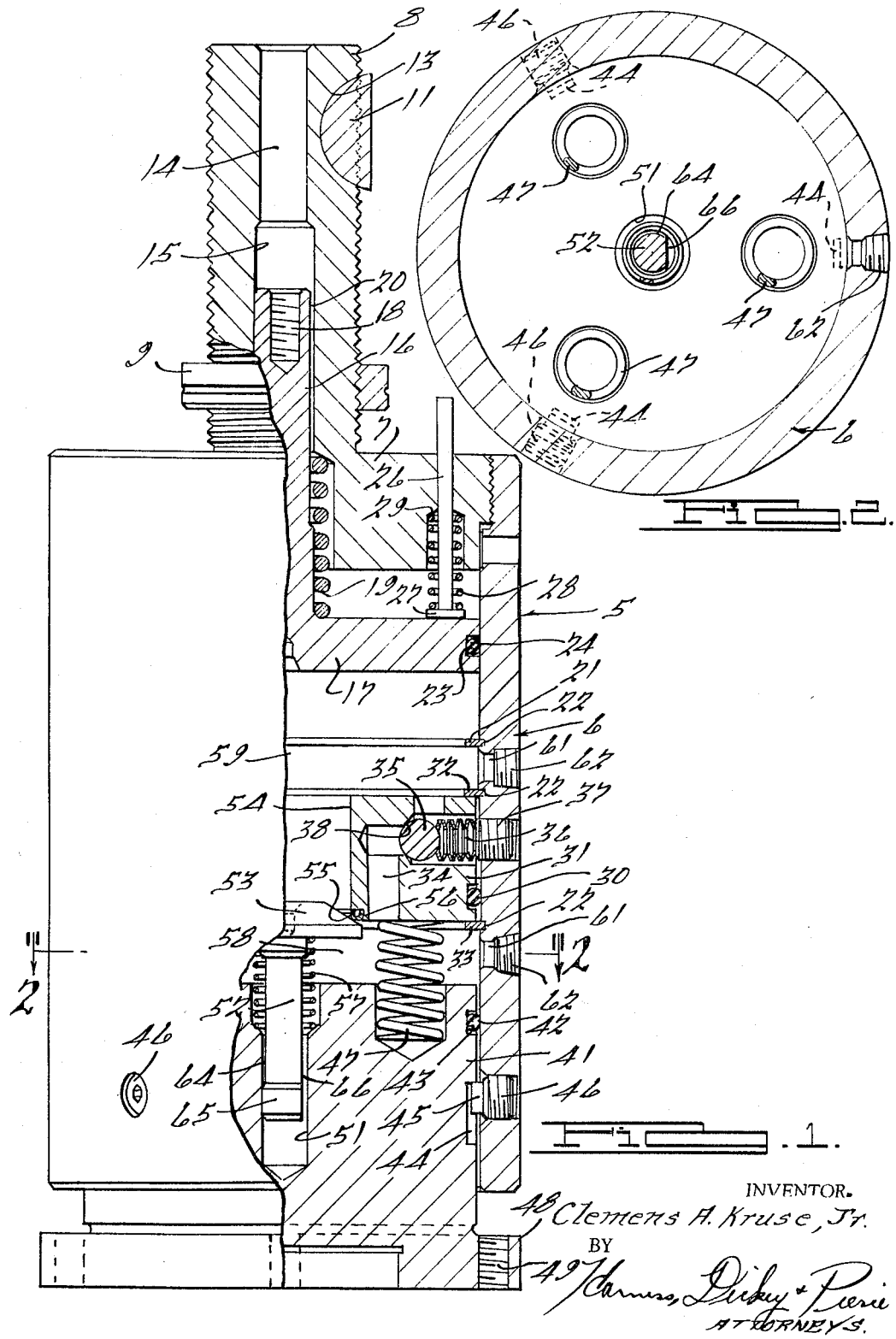
INVENTOR.
Clemens A. Kruse, Jr.
BY
Harness, Dickey & Pierce
ATTORNEYS.

United States Patent Office 3,286,594
Patented Nov. 22, 1966

3,286,594
PRESSURE CONTROL TOOL DRIVING DEVICE
Clemens A. Kruse, Jr., 1718 Waverly Road,
Ann Arbor, Mich.
Filed Aug. 10, 1965, Ser. No. 478,649
8 Claims. (Cl. 90—11)

This invention relates to retractable tool holders and particularly to a holder which permits the tool to retract when the pressure thereon exceeds a predetermined amount.

Oftentimes when a tool is fed at a predetermined rate, the pressure thereon exceeds the maximum which the tool can stand, resulting in the breaking or damage of the tool followed by the loss due to shutdown time of the machine. This becomes of substantial significance in automatic machines in which a large number of tools are operating. This is also true when applying pressure on a facing tool due to the variation in thickness of the material which will vary the pressure on the tool when a set feed is employed.

The present invention pertains to a head for supporting the tool when driven by a spindle and advanced into the work. The head is so constructed that when a predetermined force on the tool is reached its advancement will be slowed down by the retraction of a piston within the head. This retraction is also employed to permit the piston and tool to apply the same pressure on work pieces which vary in thickness. This is accomplished by providing a driven cylinder with a central partition containing an adjustable relief valve. The tool is supported on a floating piston in the forward end of the cylinder and is limited in its forward movement by pins extending within slots in the piston body. Springs urge the piston outwardly of the cylinder a maximum amount and a refill valve is provided in the piston for closing an opening through the central partition.

A second spring-pressed piston is provided in the closed end of the cylinder to form a reservoir above the partition on which a predetermined pressure is produced by a spring which abuts the piston. A spring-pressed pin passes through the head of the cylinder and is urged against the piston to indicate the amount of fluid that is retained within the reservoir. A shank on the head at the closed end of the cylinder is attachable to the arbor of a machine which advances the cylinder and tool at a predetermined rate, and in most cases rotates the cylinder and the tool at the same time.

As the work is being performed by the tool, the tool will advance at the same rate as the spindle when the pressure on the tool is below a predetermined maximum amount. Should the pressure exceed the amount, the floating piston will move back into the cylinder as the fluid between the cylinder and the partition is forced through the relief valve into the reservoir thus preventing the load on the tool exceeding the maximum amount or a maximum can be set for the tool operation. The maximum pressure will be maintained during the machining operation but the rate of advancement of the tool relative to that of the spindle will be reduced as the piston retracts within the cylinder. This prevents breakage and permits the overriding of coining and facing tool when the work pieces vary in thickness. After the machining operation and the movement of the tool away from the work, the springs between the fixed partition and the floating piston will return the floating piston to its forward position. The pressure on the fluid in the reservoir will open the valve carried by the floating piston and permit the expelled fluid to be returned to the area between the floating piston and the fixed partition.

The extension of the indicating pin from the closed end of the cylinder will provide an indication of the amount of fluid in the reservoir. With this arrangement not more than the maximum amount of pressure can be applied to the tool, and while the pressure is being applied, the tool will operate at maximum pressure and will retract with the floating piston so that the rate of advancement is reduced or an override provided. Fill plugs are located on one side of the cylinder; one for the reservoir and one for the area between the floating piston and fixed partition by which the fluid charge is initially applied and by which it is replenished in case additional fluid is required.

Accordingly, the main objects of the invention are to provide a driving head for a tool which permits the tool to retract when a selected pressure has been reached thereby reducing the rate of advancement during the machining operation; to provide a floating piston in a cylinder in a tool supporting head having a fixed partition containing a relief valve through which the fluid is expelled when the pressure equals an amount for which the adjustable relief valve is set; to provide a pressurized fluid reservoir in a driving head for a tool into which a fluid backing up a floating piston is delivered past a relief valve which permits the floating piston to retract when a maximum pressure on the fluid has been reached, and in general, to provide a self contained driving head for a tool which permits the rate of advancement of the tool to be reduced, which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a broken sectional view of the driving head for a tool which embodies the present invention, and FIGURE 2 is a sectional view of the structure illustrated in FIGURE 1 taken on the line 2—2 thereof.

The driving head 5 for the tool comprises a tubular cylinder 6 having a head end 7 threaded therein. The head has a shank 8 with a nut 9 threaded thereon and a key 11 supported in an arcuate slot 13. The shank has an aperture 14 on the center thereof, which is enlarged at 15 for receiving the stem 16 of a piston 17. The stem has a flat side 20 to provide clearance with the wall of the aperture 15 for the passage of air. The stem has a central threaded aperture 18 for a purpose that will be explained hereinafter. A spring 19 is disposed about the stem 16 which urges the piston 17 forwardly until its movement is interrupted by a stop ring 21 which is supported within an aperture 22 in the inner wall of the cylinder 6. The periphery of the piston 17 has a slot 23 for receiving a sealing O-ring 24 which is disposed in engagement with the inner wall of the cylinder 6. The head end 7 contains an aperture 25 through which a pin 26 extends to indicate the position of the piston 17 when retracted from the stop ring 21. The pin 26 has a head 27 thereon which is engaged by one end of a spring 28, the opposite end of which bottoms within an aperture 29 on the inner face of the head end 7. As the stem 16 retracts within the aperture 15, the piston 17 will be moved toward the head end 7 and the extension of the end of the pin 26 from the aperture 25 indicates the position of the piston 17.

A partition 31 is sealed to the central part of the cylinder 6 by an O-ring 30 where it is retained by split spring rings 32 and 33 which extend within slots 22 in the inner face of the cylinder 6. The partition has an offset passageway 34 blocked by a ball 35 which is backed by a plurality of spring washers 36, the tension of which may be changed by adjusting a set screw 37. The ball 35 is urged upon a seat 38 within the passageway 34, as clearly illustrated in FIG. 1.

A floating piston 41 is disposed within the open end of the cylinder 6, being sealed thereto by an O-ring 42 disposed within a slot 43 in the peripheral wall of the piston. A plurality of slots 44 are provided in the wall of the piston 41 in which the projecting end 45 of a set screw 46 projects for limiting the movement of the piston and for retaining it against rotation within the cylinder 6. The piston 41 is urged outwardly from the partition by a plurality of springs 47 which are herein illustrated as 3 in number. The forward movement of the piston 41 is stopped by the projection 45 on striking the inner end of the slots 44. The forward end of the piston 41 has a head 48 to which the tool or an adapter therefor is secured by screws threaded into apertures 49.

A central aperture 51 is provided in the piston 41 for the reception of a stem 52 carrying a truncated conical valve head 53. The stem has a reduced central portion 64 and an enlarged bearing end section 65 which guides the stem and permits the head 53 to shift a small amount. A side 66 of the stem 52 is cut away so that the fluid in the aperture 51 will not interfere with the stem movement. The fixed partition 31 has a central aperture 54 containing a shoulder 55 which receives a cup-shaped sealing ring 56 against which the sloping surface of the valve head 53 engages when urged thereagainst by a spring 57. Below the partition 31 and valve head 53, a chamber 58 is formed with the piston 41 in which the working fluid is retained. Above the fixed partition 31 and below the piston 17, a chamber 59 forms a reservoir for the fluid delivered to and from the chamber 58. Along a longitudinal edge of the cylinder 6, passageways 61 are provided closed by plugs 62 through which fluid is introduced to the chambers 58 and 59. Preferably, a hydraulic oil is employed in the chambers and when this is supplied, a stud is threaded into the aperture 18 of the stem 16 of the valve head 17. A nut on the end of the stud is screwed down upon the thread against the end of the shank 8 for drawing the stem 16 outwardly until the end of the pin 26 projects a substantial distance from the head 7, which, for the tool herein illustrated, would be approximately ⅝ inch. The cylinder 6 is disposed horizontal with the plugs 26 at the top and upon their removal the oil is poured through the passageway 61 into the chambers 58 and 59 until they are completely filled and free of any air. Thereafter the plugs 62 are replaced to seal the chambers against the leakage of any fluid from the passageways 61. The stud is then screwed out of the threaded aperture 8 permitting the spring 19 to urge the piston 17 against the oil within the chambers 58 and 59. The tool supporting head is now ready to operate in any plane, either upwardly, downwardly, horizontally, or at any angle.

When the tool has been applied to the head 48 and the arbor 8 has been attached to a spindle, the spindle is advanced to move the tool into the work to perform a machining operation. The tensions on the spring washers 36 have been regulated through the adjustment of the screw 37 to require a predetermined force on the tool to be reached before the ball 35 will move from the seat 38 and permit the oil in the chamber 58 to pass through the passageway 34 to the chamber 59. Should this occur during the machining operation, the oil can pass to the reservoir as the piston 41 retracts permitting the machining operation to occur with the maximum pressure on the tool at a reduced rate of advancement due to the retraction of the piston 41 in the cylinder 6. When a maximum pressure is employed with a fixed degree of feed, the retraction of the piston 41 permits the tool to override the work in facing operations to take care of work pieces of different thickness. The arrangement permits the machine operation to be performed without damaging the tool or any part of the driving mechanism therefor. After the machine operation, the springs 47 will urge the piston 41 downwardly against the projections 45 and the pressure on the oil in the chamber 58 produced by the piston 17 and spring 19, will cause the fluid therein to open the valve head 53 urging it downwardly so that the oil can pass from the chamber 58 into the chamber 59, so that the cycle of operation can be repeated. In the tool of the size illustrated, the pressure on the tool may be set to vary from 0 to 7500 pounds. It is to be understood that larger and heavier types of heads may be made to handle much heavier loads. The structure of the head, however, will follow that herein illustrated and above described.

What is claimed is:

1. In a head for driving a tool from a spindle and advancing the tool into the work, a cylinder having a closed end securable to a spindle, a partition within the cylinder forming an upper and lower chamber, a floating piston in the lower chamber having means for supporting a tool, stop means limiting the movement of the floating piston from the cylinder end, springs between the floating piston and the partition for urging the latter outwardly a maximum amount, the partition having a passageway therethrough closed by a relief valve which limits the force which can be applied on the fluid in the lower chamber by the floating piston the movement of which into the cylinder reduces the rate of advancement of the tool.

2. In a head for supporting a tool and advancing it into the work, a cylinder having a closed driving end, a partition within the cylinder having a passageway therethrough, a relief valve in said passageway, and means for adjusting the valve to change the force required for its release, a reservoir above the fixed partition, pressure actuated means above the partition forming a chamber for a fluid, a floating piston at the open end of the cylinder, stop means for limiting the outward movement of the piston while permitting it to retract within the cylinder a predetermined amount, resilient means urging the floating piston outwardly of the cylinder, and a fluid in a second chamber between the floating piston and the partition by which a pressure is applied to the floating piston and the tool carried thereby which cannot exceed a predetermined amount because of the relief valve which permits the piston to retract within the cylinder as the cylinder continues to advance.

3. In a head for supporting a tool and advancing it into the work, a cylinder having a closed driving end, a partition within the cylinder having a passageway therethrough, a relief valve in said passageway, and means for adjusting the valve to change the force required for its release, a reservoir above the fixed partition, pressure actuated means above the partition forming a chamber for a fluid, a floating piston at the open end of the cylinder, stop means for limiting the outward movement of the piston while permitting it to retract within the cylinder a predetermined amount, resilient means urging the floating piston outwardly of the cylinder, and a fluid in a second chamber between the floating piston and the partition by which a pressure is applied to the floating piston and the tool carried thereby which cannot exceed a predetermined amount because of the relief valve which permits the piston to retract within the cylinder as the cylinder continues to advance, a valve carried by the floating piston, a seal about a passageway through the partition engaged by the last said valve which permits the fluid to pass from the first said chamber to said second chamber when the tool is removed from the work and the pressure is removed from the floating piston.

4. In a head for driving a tool, a cylindrical body having a shank attachable to a driving spindle, a floating piston in the opposite end of the body having stop means for limiting its movement therefrom, tool supporting means on said piston, spring means for urging the piston outwardly of the body, a fluid within the body, and valve means through which the fluid passes when the pressure thereon reaches a predetermined amount to reduce the rate of advancement of the tool.

5. In a head for driving a tool, a cylindrical body having a shank attachable to a driving spindle, a floating piston in the opposite end of the body having stop means for limiting its movement therefrom, tool supporting means on said piston, spring means for urging the piston outwardly of the body, a fluid within the body, valve means through which the fluid passes when the pressure thereon reaches a predetermined amount, and means for adjusting the valve means for changing the pressure at which the fluid will pass therethrough.

6. In a head for driving a tool, a cylindrical body having a shank attachable to a driving spindle, a floating piston in the opposite end of the body having stop means for limiting its movement therefrom, tool supporting means on said piston, spring means for urging the piston outwardly of the body, a fluid within the body, valve means through which the fluid passes when the pressure thereon reaches a predetermined amount, means for adjusting the valve means for changing the pressure at which the fluid will pass therethrough, said body having having a reservoir for receiving the expelled fluid, and means for returning the fluid from the reservoir to the area of the movable piston when pressure is relieved therefrom.

7. In a head for driving a tool, a cylindrical body having a shank attachable to a driving spindle, a floating piston in the opposite end of the body having stop means for limiting its movement therefrom, tool supporting means on said piston, spring means for urging the piston outwardly of the body, a fluid within the body, valve means through which the fluid passes when the pressure thereon reaches a predetermined amount, means for adjusting the valve means for changing the pressure at which the fluid will pass therethrough, said body having a reservoir for receiving the expelled fluid, means for returning the fluid from the reservoir to the area of the movable piston when pressure is relieved therefrom, and an indicating element extending through the body to provide visible indication of the amount of fluid therewithin.

8. In a head for driving a tool, a cylindrical body having a shank attachable to a driving spindle, a floating piston in the opposite end of the body having stop means for limiting its movement therefrom, tool supporting means on said piston, spring means for urging the piston outwardly of the body, a fluid within the body, valve means through which the fluid passes when the pressure thereon reached a predetermined amount, means for adjusting the valve means for changing the pressure at which the fluid will pass therethrough, said body having a reservoir for receiving the expelled fluid, means for returning the fluid from the reservoir to the area of the movable piston when pressure is relieved therefrom, an indicating element extending through the body to provide visible indication of the amount of fluid therewithin, and means for applying a predetermined pressure on the fluid within the reservoir.

No references cited.

WILLIAM W. DYER, JR., *Primary Examiner.*

GERALD A. DOST, *Assistant Examiner.*